US012794646B2

(12) United States Patent
Lei

(10) Patent No.: US 12,794,646 B2
(45) Date of Patent: Nov. 10, 2026

(54) METHOD AND APPARATUS FOR HARQ-ACK CODEBOOK DETERMINATION

(71) Applicant: LENOVO (BEIJING) LIMITED, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 268 days.

(21) Appl. No.: 18/701,422

(22) PCT Filed: Dec. 24, 2021

(86) PCT No.: PCT/CN2021/141121
§ 371 (c)(1),
(2) Date: Apr. 15, 2024

(87) PCT Pub. No.: WO2023/115519
PCT Pub. Date: Jun. 29, 2023

(65) Prior Publication Data

US 2025/0007671 A1 Jan. 2, 2025

(51) Int. Cl.
*H04L 5/00* (2006.01)
*H04W 72/0446* (2023.01)
(Continued)

(52) U.S. Cl.
CPC ....... *H04L 5/0055* (2013.01); *H04W 72/0446* (2013.01); *H04W 72/1268* (2013.01); *H04W 72/232* (2023.01)

(58) Field of Classification Search
CPC ... H04L 5/0055; H04L 1/1664; H04L 1/1854; H04L 1/1861; H04L 1/1896;
(Continued)

(56) References Cited

U.S. PATENT DOCUMENTS

| | | | | |
|---|---|---|---|---|
| 2021/0050950 | A1 | 2/2021 | Zhou et al. | |
| 2021/0160879 | A1* | 5/2021 | Lin | H04W 72/0453 |

(Continued)

FOREIGN PATENT DOCUMENTS

| | | | |
|---|---|---|---|
| CN | 111277388 | A | 6/2020 |
| CN | 113632526 | A | 11/2021 |

(Continued)

OTHER PUBLICATIONS

PCT/CN2021/141121, "International Search Report and Written Opinion", International Searching Authority, Sep. 21, 2022, pp. 1-6.

(Continued)

*Primary Examiner* — Andrew W Chriss
(74) *Attorney, Agent, or Firm* — Kunzler Needham Hilton

(57) ABSTRACT

Embodiments of the present disclosure relate to HARQ-ACK codebook determination. According to some embodiments of the disclosure, a UE may: receive a plurality of group-common DCI formats for scheduling a plurality of PDSCHs for a multicast service, wherein each of the plurality of group-common DCI formats includes a DAI and an HEI: generate, based on the DAI and HEI, a HARQ-ACK codebook for the multicast service; and transmit the HARQ-ACK codebook.

20 Claims, 4 Drawing Sheets

(51) Int. Cl.
*H04W 72/1268* (2023.01)
*H04W 72/232* (2023.01)

(58) Field of Classification Search
CPC ......... H04L 2001/0093; H04L 5/0053; H04W 72/0446; H04W 72/1268; H04W 72/232; H04W 72/30
See application file for complete search history.

(56) References Cited

U.S. PATENT DOCUMENTS

| | | | | |
|---|---|---|---|---|
| 2022/0039029 | A1* | 2/2022 | Zhang | H04W 52/146 |
| 2022/0095317 | A1* | 3/2022 | Papasakellariou | H04L 5/0053 |
| 2022/0124783 | A1* | 4/2022 | Park | H04L 1/1812 |
| 2022/0183032 | A1* | 6/2022 | Papasakellariou | H04L 1/1861 |
| 2022/0272740 | A1* | 8/2022 | Papasakellariou | H04W 72/1273 |
| 2023/0049911 | A1* | 2/2023 | Hu | H04L 1/1812 |
| 2024/0214126 | A1* | 6/2024 | Gou | H04L 1/1812 |
| 2024/0340106 | A1* | 10/2024 | Nishio | H04L 1/1614 |
| 2025/0089044 | A1* | 3/2025 | Ying | H04L 1/1854 |

FOREIGN PATENT DOCUMENTS

| | | | |
|---|---|---|---|
| WO | 2021207470 | A1 | 10/2021 |
| WO | 2021217378 | A1 | 11/2021 |
| WO | 2021255936 | A1 | 12/2021 |

OTHER PUBLICATIONS

FUTUREWEI, "Further Discussions on Reliability for RRC_CONNECTED UEs", 3GPP TSG RAN WG1#105-e R1-2104196, May 19-27, 2021, pp. 1-5.
HUAWEI et al., "Mechanisms to improve reliability for RRC_CONNECTED UEs", 3GPP TSG RAN WG1 #105-e R1- 2104249, May 10-27, 2021, pp. 1-8.
ZTE, "Discussion on mechanisms to Improve Reliability for RRC_CONNECTED UEs", 3GPP TSG RAN WG1 #105-e R1-2104337, May 10-27, 2021, pp. 1-14.
VIVO, "Discussion on mechanisms to improve reliability for RRC_CONNECTED UEs", 3GPP TSG RAN WG1 #105-e R1-2104388, May 10-27, 2021, pp. 1-7.
SPREADTRUM COMM., "Mechanisms to improve MBS reliability for RRC_CONNECTED UEs", 3GPP TSG RAN WG1 #105-e R1-2104443, May 10-27, 2021, pp. 1-6.
CATT et al., "Discussion on reliability improvement mechanism for RRC_CONNECTED UEs in MBS", 3GPP TSG RAN WG1 #105-e R1-2104492, May 19-27, 2021, pp. 1-10.
Nokia et al., "Reliability Improvements for RRC_CONNECTED UEs", 3GPP TSG RAN WG1 Meeting #105-e R1-2104551, May 19-27, 2021, pp. 1-24.
CMCC, "Discussion on reliability improvement", 3GPP TSG RAN WG1 #105-e R1-2104633, May 10-27, 2021, pp. 1-10.
QUALCOMM INC., "Views on UE feedback for Multicast RRC_CONNECTED UEs", 3GPP TSG RAN WG1 #105-e R1-2104696, May 10-27, 2021, pp. 1-8.
OPPO, "UL feedback for RRC-CONNECTED UEs in MBS", 3GPP TSG RAN WG1 #105-e R1-2104760, May 10-27, 2021, pp. 1-6.
Intel Corp., "Mechanisms to Improve Reliability of NR MBS for RRC_CONNECTED UEs", 3GPP TSG RAN WG1 #104bis-e R1-2104929, May 19-27, 2021, pp. 1-7.
Apple Inc., "Discussion on MBS reliability improvement for RRC_CONNECTED UEs", 3GPP TSG RAN WG1 #105-e R1-2105129, May 10-27, 2021, pp. 1-4.
Samsung, "On mechanisms to improve reliability for RRC_CONNECTED UEs", 3GPP TSG RAN WG1 #105 R1-2105337, May 19-27, 2021, pp. 1-6.
Mediatek Inc., "Discussion on mechanisms to improve reliability for RRC_CONNECTED UEs", 3GPP TSG RAN WG1 #104b-e R1-2105382, May 10-27, 2021, pp. 1-5.
LG Electronics Inc., "Mechanisms to improve Reliability of Broadcast/Multicast service", 3GPP TSG RAN WG1 Meeting #105-e R1-2105438, May 10-27, 2021, pp. 1-13.
Ericsson, "Discussion on reliability mechanisms for NR MBS", 3GPP TSG-RAN WG1 Meeng #105-e R1-2105915, May 10-27, 2021, pp. 1-16.
3GPP, "3rd Generation Partnership Project; Technical Specification Group Radio Access Network; NR; Multiplexing and channel coding (Release 16)", 3GPP TS 38.212 V16.6.0, Jun. 2021, pp. 1-153.
3GPP, "3rd Generation Partnership Project; Technical Specification Group Radio Access Network; NR; Physical layer procedures for control (Release 16)", 3GPP TS 38.213 V16.7.0, Sep. 2021, pp. 1-188.
3GPP, "3rd Generation Partnership Project; Technical Specification Group Radio Access Network; NR; Physical layer procedures for data (Release 16)", 3GPP TS 38.214 V16.6.0, Jun. 2021, pp. 1-172.
Lenovo et al., "Discussion on reliability improvement for RRC-CONNECTED UEs", 3GPP TSG RAN WG1 #104b-e R1-2103547, Apr. 12-20, 2021, pp. 1-7.
Huawei, "FL summary#1 on improving reliability for MBS for RRC_CONNECTED UEs", 3GPP TSG RAN WG1 Meeting #104bis-e R1-2103834, Apr. 12-20, 2021, pp. 1-44.
Huawei, "FL summary#4 on improving reliability for MBS for RRC_CONNECTED UEs", 3GPP TSG RAN WG1 #107-e R1-2112592, Nov. 11-19, 2021, pp. 1-88.

* cited by examiner

METHOD AND APPARATUS FOR HARQ-ACK CODEBOOK DETERMINATION

TECHNICAL FIELD

Embodiments of the present disclosure generally relate to wireless communication technology, and more particularly to hybrid automatic repeat request acknowledgement (HARQ-ACK) codebook determination.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may monitor a physical downlink control channel (PDCCH) in one or more search spaces. The PDCCH may carry downlink control information (DCI), which may schedule uplink channels, such as a physical uplink shared channel (PUSCH), or downlink channels, such as a physical downlink shared channel (PDSCH). A UE may transmit hybrid automatic repeat request acknowledgement (HARQ-ACK) feedback (e.g., included in a HARQ-ACK codebook) corresponding to PDSCH transmissions through a physical uplink control channel (PUCCH) or a physical uplink shared channel (PUSCH).

The industry desires technologies for facilitating HARQ-ACK codebook determination in a communication system.

SUMMARY

Some embodiments of the present disclosure provide a user equipment (UE). The UE may include: a transceiver; and a processor coupled to the transceiver. The processor may be configured to: receive a plurality of group-common downlink control information (DCI) formats for scheduling a plurality of physical downlink shared channels (PDSCHs) for a multicast service, wherein each of the plurality of group-common DCI formats includes a downlink assignment index (DAI) and a hybrid automatic repeat request acknowledgement (HARQ-ACK) feedback enabling/disabling indicator (HEI); generate, based on the DAI and HEI, a HARQ-ACK codebook for the multicast service; and transmit the HARQ-ACK codebook.

Some embodiments of the present disclosure provide a base station (BS). The BS may include: a transceiver; and a processor coupled to the transceiver. The processor may be configured to: transmit a plurality of group-common downlink control information (DCI) formats for scheduling a plurality of physical downlink shared channels (PDSCHs) for a multicast service, wherein each of the plurality of group-common DCI formats includes a downlink assignment index (DAI) and a hybrid automatic repeat request acknowledgement (HARQ-ACK) feedback enabling/disabling indicator (HEI); and receive a HARQ-ACK codebook for the multicast service, wherein the HARQ-ACK codebook is generated based on the DAI and HEI.

Some embodiments of the present disclosure provide a method for wireless communication performed by a user equipment (UE). The method may include: receiving a plurality of group-common downlink control information (DCI) formats for scheduling a plurality of physical downlink shared channels (PDSCHs) for a multicast service, wherein each of the plurality of group-common DCI formats includes a downlink assignment index (DAI) and a hybrid automatic repeat request acknowledgement (HARQ-ACK) feedback enabling/disabling indicator (HEI); generating, based on the DAI and HEI, a HARQ-ACK codebook for the multicast service; and transmitting the HARQ-ACK codebook.

Some embodiments of the present disclosure provide a method for wireless communication performed by a base station (BS). The method may include: transmitting a plurality of group-common downlink control information (DCI) formats for scheduling a plurality of physical downlink shared channels (PDSCHs) for a multicast service, wherein each of the plurality of group-common DCI formats includes a downlink assignment index (DAI) and a hybrid automatic repeat request acknowledgement (HARQ-ACK) feedback enabling/disabling indicator (HEI); and receiving a HARQ-ACK codebook for the multicast service, wherein the HARQ-ACK codebook is generated based on the DAI and HEI.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture(s) and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
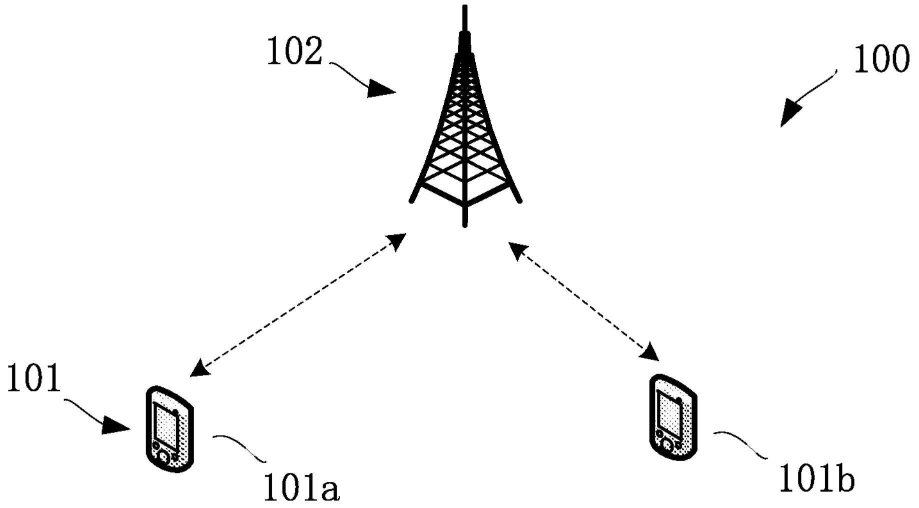
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support multicast and broadcast services (MBSs). For example, one or more UEs (e.g., UE 101*a* and UE 101*b*) may be grouped as an MBS group to receive an MBS(s) (e.g., an MBS PDSCH) from a BS (e.g., BS 102).

A group-common radio network temporary identifier (RNTI) (e.g., group-RNTI (G-RNTI)) is introduced for an MBS so that a UE can differentiate a DCI format (hereinafter, "group-common DCI format") scheduling a group-common PDSCH carrying an MBS service (e.g., an MBS PDSCH) from a DCI format scheduling a UE-specific PDSCH carrying a unicast service. For example, the cyclic redundancy check (CRC) of the DCI format scheduling the unicast PDSCH may be scrambled by a UE-specific RNTI (e.g., cell-RNTI (C-RNTI)) and the scheduled unicast PDSCH may also be scrambled by the UE-specific RNTI. The CRC of the DCI format scheduling the group-common PDSCH may be scrambled by a G-RNTI and the scheduled group-common PDSCH carrying the MBS may also be scrambled by the G-RNTI. When a UE supports multiple MBS services, each service may be configured with a G-RNTI specific to the service. In other words, from a UE's perspective, the G-RNTIs can be used to differentiate the multiple MBS services.

The HARQ-ACK feedback from the UEs corresponding to a downlink multicast transmission is essential for the multicast services in order to satisfy the QOS requirement, e.g., reliability. An MBS may support the enabling and disabling of the HARQ-ACK feedback.

In some embodiments of the present disclosure, radio resource control (RRC) signaling may be used to enable or disable the HARQ-ACK feedback for an MBS. This RRC configuration may be configured per a G-RNTI (e.g., per an MBS corresponding to the G-RNTI) by UE-specific RRC signaling. If HARQ-ACK feedback for a specific G-RNTI or MBS is enabled, a UE may transmit corresponding HARQ-ACK feedback in the indicated slot using the indicated PUCCH resource. Otherwise, if HARQ-ACK feedback for a specific G-RNTI or MBS is disabled, a UE may ignore the HARQ-ACK feedback related fields and not transmit corresponding HARQ-ACK feedback.

In some embodiments of the present disclosure, RRC signaling may be used to configure the presence of a field for indicating the enabling or disabling of the HARQ-ACK feedback (hereinafter, "HARQ-ACK feedback enabling/disabling indicator (HEI)") in a group-common DCI format for multicast scheduling. The configuration may be configured per a G-RNTI (e.g., per an MBS corresponding to the G-RNTI). The HEI field may include one bit. Whether the HARQ-ACK feedback for a G-RNTI (or the corresponding MBS) is enabled or disabled may be determined based on the HEI field in the group-common DCI with the CRC scrambled by the G-RNTI.

When RRC signaling configures the presence of the HEI in a DCI format with a CRC scrambled by a given G-RNTI, in the case that the DCI format is missed by a UE, the UE cannot know whether the HEI of the DCI format indicates enabled HARQ-ACK feedback or disabled HARQ-ACK feedback, and thus cannot determine a HARQ-ACK codebook for the multicast service corresponding to the given G-RNTI. Needless to say, when HARQ-ACK feedback for a unicast or HARQ-ACK feedback for another multicast service associated with another G-RNTI is to be multiplexed in the same HARQ-ACK codebook, it would be more problematic for the UE to determine the HARQ-ACK codebook. A Misunderstanding of the HARQ-ACK codebook size between a UE and a BS can easily occur.

Figure 2:
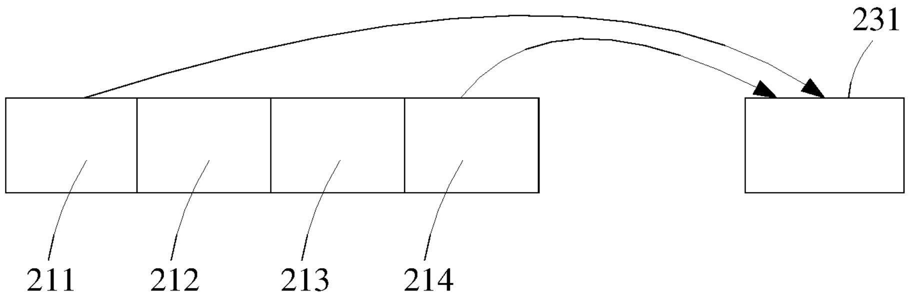
FIG. 2 illustrates a schematic diagram of HARQ-ACK codebook determination in accordance with some embodiments of the present disclosure.

For example, referring to FIG. 2, it is assumed that a UE supports multicast service #A associated with G-RNTI #A. A BS may transmit, to the UE, four DCI formats 211-214 with downlink assignment indexes (DAIs) equal to 1, 2, 3, and 4 (e.g., "00", "01", "10", and "11"), respectively, to schedule four PDSCHs (e.g., PDSCHs #1-#4) associated with multicast service #A. In some embodiments, the DAIs may indicate the accumulative number of {serving cell, PDCCH monitoring occasion}-pair(s) in which PDSCH reception(s), a semi-persistent scheduling (SPS) PDSCH release or a secondary cell (SCell) dormancy indication associated with the DCI formats is present, up to the current serving cell and current PDCCH monitoring occasion.

In some embodiments of the present disclosure, the BS may enable HARQ-ACK feedback for PDSCHs #1 and #4 by enabling the HEIs in DCI formats 211 and 214, for example, setting the HEIs to "1." The BS may further indicate that HARQ-ACK feedback for PDSCHs #1 and #4 is to be transmitted in the same slot (e.g., on PUCCH 231). Moreover, the BS may disable HARQ-ACK feedback for PDSCHs #2 and #3 by disabling the HEIs in DCI formats 212 and 213, for example, setting the HEIs to "0." That is, the UE does not need to transmit HARQ-ACK feedback for PDSCHs #2 and #3 scheduled by DCI formats 212 and 213.

In some examples, assuming that DCI format 212 is missed by the UE, according to the DAIs, the UE can identify that a DCI format is missed between DCI format 211 and DCI format 213. However, the UE cannot determine whether the HARQ-ACK feedback for the PDSCH (e.g., PDSCH #2) scheduled by the missed DCI format is enabled or not.

In some other examples, assuming that DCI format 211 is missed by the UE, according to the DAIs, the UE can identify that a DCI format is missed before DCI format 212. However, the UE cannot determine whether the HARQ-ACK feedback for the PDSCH (e.g., PDSCH #1) scheduled by the missed DCI format is enabled or not. As a result, the UE cannot determine the HARQ-ACK codebook for multicast service #A. Further, the UE cannot multiplex the HARQ-ACK feedback for multicast service #A with the unicast HARQ-ACK feedback, the HARQ-ACK feedback for another multicast service(s), or a combination thereof in the same HARQ-ACK codebook.

Embodiments of the present disclosure provide solutions for HARQ-ACK codebook determination. For example, solutions for determining a HARQ-ACK codebook for at least one multicast service are provided. For example, solutions for determining a HARQ-ACK codebook for at least one multicast service and a unicast service are proposed. These solutions can solve the HARQ-ACK codebook misunderstanding between a UE and a BS. More details on the embodiments of the present disclosure will be illustrated in the following text in combination with the appended drawings.

In some embodiments of the present disclosure, when the HEI is configured to be present in a group-common DCI format for a multicast service associated with a specific G-RNTI by, for example, RRC signaling, the DAI (e.g., counter DAI) in the DCI format may be used to indicate an accumulative number of transmitted DCI formats for the multicast service with an enabled HEI.

For example, the DAI (e.g., counter DAI) in a group-common DCI format for the multicast service may indicate the accumulative number of {serving cell, PDCCH monitoring occasion}-pair(s) in which PDSCH reception(s), SPS PDSCH activation, an SPS PDSCH release or an SCell dormancy indication associated with the DCI formats with CRCs scrambled by the specific G-RNTI is present and the HARQ-ACK feedback corresponding to the PDSCH reception(s), SPS PDSCH activation, an SPS PDSCH release or an SCell dormancy indication is required, up to the current serving cell and current PDCCH monitoring occasion. For example, the DAI (e.g., counter DAI) in a group-common DCI format for the multicast service may indicate the accumulative number of transmitted DCI formats with CRCs scrambled by the specific G-RNTI for scheduling a multicast PDSCH, activating a multicast SPS PDSCH, releasing a multicast SPS PDSCH or indicating SCell dormancy, which requires HARQ-ACK feedback, up to the current serving cell and current PDCCH monitoring occasion.

In some examples, when a group-common DCI format (e.g., DCI format #2A) indicating disabled HARQ-ACK feedback (e.g., DCI format #2A including a disabled HEI) is transmitted later than another group-common DCI format (e.g., DCI format #1A) with enabled HARQ-ACK feedback (e.g., DCI format #1A including enabled HEI), the DAI (e.g., counter DAI) in DCI format #2A may be set to the same value as that in DCI format #1A.

In some examples, when a group-common DCI format (e.g., DCI format #3B) indicating disabled HARQ-ACK feedback (e.g., DCI format #3B including a disabled HEI) is transmitted later than another group-common DCI format (e.g., DCI format #2B) with disabled HARQ-ACK feedback (e.g., DCI format #2B including a disabled HEI), the DAI (e.g., counter DAI) in DCI format #3B may be set to the same value as that in DCI format #2B.

In some examples, when a group-common DCI format (e.g., DCI format #1C) indicating disabled HARQ-ACK feedback (e.g., DCI format #1C including a disabled HEI) is transmitted earlier than other group-common DCI formats with enabled HARQ-ACK feedback, which is to be transmitted in the same slot, the DAI (e.g., counter DAI) in DCI format #1C may be set to a predefined value (e.g., 0 or 1).

In some embodiments of the present disclosure, a multicast service may be transmitted on a plurality of carriers. A group-common DCI format for the multicast service associated with a specific G-RNTI may include two DAIs, for example, a counter DAI and a total DAI. The above descriptions with respect to the DAI may be applied to the counter DAI. The total DAI, when present, in the group-common DCI format for the multicast service may be used to indicate a total number of group-common DCI formats on the plurality of carriers with an enabled HEI.

For example, the total DAI in a group-common DCI format for the multicast service may indicate the total number of {serving cell, PDCCH monitoring occasion}-pair(s) in which PDSCH reception(s), SPS PDSCH activation, an SPS PDSCH release or an SCell dormancy indication associated with the DCI formats with CRCs scrambled by specific G-RNTI is present and the HARQ-ACK feedback corresponding to the PDSCH reception(s), SPS PDSCH activation, an SPS PDSCH release or an SCell dormancy indication is required, up to the current PDCCH monitoring occasion. The total DAI may be updated from a PDCCH monitoring occasion to a PDCCH monitoring occasion. For example, the total DAI in a group-common DCI format for the multicast service may indicate the total number of DCI formats with CRCs scrambled by the specific G-RNTI for scheduling a multicast PDSCH, activating a multicast SPS PDSCH, releasing a multicast SPS PDSCH or indicating SCell dormancy, which requires HARQ-ACK feedback, up to the current PDCCH monitoring occasion.

The HARQ-ACK codebook for a multicast service associated with a specific G-RNTI or the HARQ-ACK sub-codebook in the case that HARQ-ACK feedback for this multicast service is to be multiplexed with HARQ-ACK feedback for a unicast service, HARQ-ACK feedback for one or more other multicast services, or both may be determined based on the DAIs (e.g., counter DAIs or total DAIs) in the group-common DCI formats for scheduling the corresponding PDSCHs for the multicast service. For example, the size of the HARQ-ACK codebook or HARQ-ACK sub-codebook for the multicast service may be determined based on the value of the counter DAI (single carrier case) or the value of the total DAI (multi-carrier case) in the last transmitted group-common DCI format among the group-common DCI formats for scheduling the corresponding PDSCHs for the multicast service. The HARQ-ACK information bits in the HARQ-ACK codebook or HARQ-ACK sub-codebook for the multicast service may be ordered according to a predefined order of the DAIs, for example, in an ascending or descending order of the counter DAIs.

For example, referring again to FIG. 2, assuming that multicast service #A is carried on a single carrier, DCI formats 211-214 may include a single DAI (e.g., counter DAI). In the case that DCI formats 211 and 214 indicate enabled HARQ-ACK feedback and DCI formats 212 and 213 indicate disabled HARQ-ACK feedback, the values of the DAIs in both DCI formats 212 and 213 are not updated because no HARQ-ACK feedback is required for PDSCHs #2 and #3. That is, the values of the DAIs in DCI formats 212 and 213 are the same as that in DCI format 211. For example, the values of the DAIs in DCI formats 211-214 are 1, 1, 1, and 2, respectively.

In some embodiments, for example, in the case that a maximum of two codewords per PDSCH and codeblock group (CBG) based transmission is not considered, each PDSCH may correspond to a single HARQ-ACK information bit. Assuming that ACK/NACK (negative ACK) based feedback is configured, according to the DAIs of the DCI formats 211-214, the BS may expect the UE to transmit a HARQ-ACK codebook or HARQ-ACK sub-codebook of {a1, a4}, wherein a1 and a4 are HARQ-ACK information bits for PDSCH #1 and PDSCH #4 respectively and may be an ACK or NACK (NACK).

In the case that DCI format 212 is missed, since the DAI in DCI format 212 is not updated, the UE cannot identify that DCI format 212 is missed and will not generate a HARQ-ACK information bit for PDSCH #2. Accordingly, the UE will generate and transmit {a1, a4} to the BS. No misunderstanding between the UE and the BS regarding the HARQ-ACK codebook size of the multicast service would occur. In the case that DCI format 211 is missed, since the DAI in DCI 214 is set as 2, the UE can identify that one DCI format which requires HARQ-ACK feedback is missed and will generate a NACK bit for PDSCH #1. In this case, the UE will generate and transmit {NACK, a4} to the BS. No misunderstanding between the UE and the BS regarding the HARQ-ACK codebook size of the multicast service would occur.

In some embodiments of the present disclosure, when the HEI is configured to be present in a group-common DCI format for a multicast service associated with a specific G-RNTI, the definition of the DAI (e.g., counter DAI and total DAI) of a group-common DCI format may follow the legacy definition. For example, the DAI (e.g., counter DAI) may indicate the accumulative number of transmitted group-common DCI formats for the multicast service. For example, instead of reusing the DAI (e.g., counter DAI and total DAI) of a group-common DCI format as described above, a group-common DCI format with a disabled HEI may include an indicator (hereinafter, "association indicator") to associate it with a group-common DCI format with an enabled HEI. In some examples, since the HARQ-ACK feedback related fields in a group-common DCI format indicating disabled HARQ-ACK feedback are useless, the association indicator may be one of the HARQ-ACK feedback related fields or any combination thereof. For example, the PDSCH-to-HARQ timing indicator (HTI), the physical uplink control channel (PUCCH) resource indicator (PRI), or any combination thereof may be reused as the association indicator. The definitions of the HARQ-ACK feedback related fields in a group-common DCI format indicating enabled HARQ-ACK feedback may follow the legacy definitions.

In some embodiments of the present disclosure, the association indicator of a group-common DCI format with a disabled HEI may indicate the position of a previous or next group-common DCI format with an enabled HEI. For example, the association indicator may indicate the slot where the previous or next group-common DCI format with an enabled HEI is transmitted.

In some examples, the association indicator of a group-common DCI format with a disabled HEI may indicate the slot offset between the slot where the current group-common DCI format is transmitted and the slot where the previous group-common DCI format with an enabled HEI is transmitted. In the case that the current group-common DCI format is transmitted earlier than any other group-common DCI formats with an enabled HEI, the association indicator of the current group-common DCI format may be set to a predefined value, e.g., 0.

Referring again to FIG. 2, assuming that multicast service #A is carried on a single carrier, DCI formats 211-214 may include a single DAI (e.g., counter DAI). The values of the DAIs in DCI formats 211-214 may be updated per a DCI format, and may be set as 1, 2, 3, and 4, respectively. In the case that DCI formats 211 and 214 indicate enabled HARQ-ACK feedback and DCI formats 212 and 213 indicate disabled HARQ-ACK feedback, the HTI in DCI format 212 may indicate a slot offset between the slot where DCI format 212 is transmitted and the slot where DCI format 211 is transmitted since DCI format 211 is the previously transmitted DCI format with an enabled HEI. The HTI in DCI format 213 may indicate a slot offset between the slot where DCI format 213 is transmitted and the slot where DCI format 211 is transmitted since DCI format 211 is the previously transmitted DCI format with an enabled HEI. The HTIs in DCI format 211 and 214 are used to indicate the slot where the corresponding HARQ-ACK feedback for PDSCH #1 and PDSCH #4 is transmitted. As an alternative, the PRI, instead of the HIT, can be used as the association indicator.

In the case that DCI format 212 is missed, the UE can identify that DCI format 212 is missed based on the DAIs in DCI formats 211 and 213. The UE may further determine that the missed DCI format indicates disabled HARQ-ACK feedback based on the association indicator in DCI format 213. Thus, the UE will not generate a HARQ-ACK information bit for PDSCH #2. Accordingly, no misunderstanding between the UE and the BS regarding the HARQ-ACK codebook size of the multicast service would occur.

In some examples, the association indicator of a group-common DCI format with a disabled HEI may indicate the slot offset between the slot where the current group-common DCI format is transmitted and the slot where the next group-common DCI format with an enabled HEI is transmitted. In the case that the current group-common DCI format is transmitted later than any other group-common DCI formats with an enabled HEI, the association indicator of the current group-common DCI format may be set to a predefined value, e.g., 0.

Referring again to FIG. 2, assuming that multicast service #A is carried on a single carrier, DCI formats 211-214 may include a single DAI (e.g., counter DAI). The values of the DAIs in DCI formats 211-214 may be updated per a DCI format, and may be set as 1, 2, 3, and 4, respectively. In the case that DCI formats 211 and 214 indicate enabled HARQ-ACK feedback and DCI formats 212 and 213 indicate disabled HARQ-ACK feedback, the HTI in DCI format 212 may indicate a slot offset between the slot where DCI format 212 is transmitted and the slot where DCI format 214 is transmitted since DCI format 214 is the next transmitted DCI format with an enabled HEI. The HTI in DCI format 213 may indicate a slot offset between the slot where DCI format 213 is transmitted and the slot where DCI format 214 is transmitted since DCI format 214 is the next DCI format with an enabled HEI. The HTIs in DCI format 211 and 214 are used to indicate the slot where the corresponding HARQ-ACK feedback for PDSCH #1 and PDSCH #4 is transmitted. As an alternative, the PRI, instead of the HIT, can be used as the association indicator.

In the case that DCI format 213 is missed, the UE can identify that DCI format 213 is missed based on the DAIs in DCI formats 212 and 214, the UE may further determine that the missed DCI format indicates disabled HARQ-ACK feedback based on the association indicator in DCI format 212. Thus, the UE will not generate a HARQ-ACK information bit for PDSCH #3. Accordingly, no misunderstanding between the UE and the BS regarding the HARQ-ACK codebook size of the multicast service would occur.

In some embodiments of the present disclosure, the association indicator of a group-common DCI format with a disabled HEI may indicate the position of a previous or next group-common DCI format with an enabled HEI. For example, the association indicator may indicate the DAI value of the previous or next group-common DCI format with an enabled HEI.

In some examples, the association indicator of a group-common DCI format with a disabled HEI may indicate the DAI (e.g., counter DAI) of the previously transmitted group-common DCI format with an enabled HEI. In the case that the current group-common DCI format is transmitted earlier than any other group-common DCI formats with an enabled HEI, the association indicator of the current group-common DCI format may be set to a predefined value, e.g., 0.

Referring again to FIG. 2, assuming that multicast service #A is carried on a single carrier, DCI formats 211-214 may include a single DAI (e.g., counter DAI). The values of the DAIs in DCI formats 211-214 may be updated per a DCI format, and may be set as 1, 2, 3, and 4, respectively. In the case that DCI formats 211 and 214 indicate enabled HARQ-ACK feedback and DCI formats 212 and 213 indicate disabled HARQ-ACK feedback, the HTI in DCI format 212 may indicate the DAI of DCI format 211 since DCI format 211 is the previously transmitted DCI format with an enabled HEI. The HTI in DCI format 213 may indicate the DAI of DCI format 211 since DCI format 211 is the previously transmitted DCI format with an enabled HEI. The HTIs in DCI format 211 and 214 are used to indicate the slot where the corresponding HARQ-ACK feedback for PDSCH #1 and PDSCH #4 is transmitted. As an alternative, the PRI, instead of the HIT, can be used as the association indicator.

In the case that DCI format 212 is missed, the UE can identify that DCI format 212 is missed based on the DAIs in DCI formats 211 and 213, the UE may further determine that the missed DCI format indicates disabled HARQ-ACK feedback based on the association indicator in DCI format 213. Thus, the UE will not generate a HARQ-ACK information bit for PDSCH #2. Accordingly, no misunderstanding between the UE and the BS regarding the HARQ-ACK codebook size of the multicast service would occur.

In some examples, the association indicator of a group-common DCI format with a disabled HEI may indicate the DAI (e.g., counter DAI) of the next transmitted group-common DCI format with an enabled HEI. In the case that the current group-common DCI format is transmitted later than any other group-common DCI formats with an enabled HEI, the association indicator of the current group-common DCI format may be set to a predefined value, e.g., 0.

Referring again to FIG. 2, assuming that multicast service #A is carried on a single carrier, DCI formats 211-214 may include a single DAI (e.g., counter DAI). The values of the DAIs in DCI formats 211-214 may be updated per a DCI format, and may be set as 1, 2, 3, and 4, respectively. In the case that DCI formats 211 and 214 indicate enabled HARQ-ACK feedback and DCI formats 212 and 213 indicate disabled HARQ-ACK feedback, the HTI in DCI format 212 may indicate the DAI of DCI format 214 since DCI format 214 is the next transmitted DCI format with an enabled HEI. The HTI in DCI format 213 may indicate the DAI of DCI format 214 is transmitted since DCI format 214 is the next DCI format with an enabled HEI. The HTIs in DCI format 211 and 214 are used to indicate the slot where the corresponding HARQ-ACK feedback for PDSCH #1 and PDSCH #4 is transmitted. As an alternative, the PRI, instead of the HIT, can be used as the association indicator.

In the case that DCI format 213 is missed, the UE can identify that DCI format 213 is missed based on the DAIs in DCI formats 212 and 214, the UE may further determine that the missed DCI format indicates disabled HARQ-ACK feedback based on the association indicator in DCI format 212. Thus, the UE will not generate a HARQ-ACK information bit for PDSCH #3. Accordingly, no misunderstanding between the UE and the BS regarding the HARQ-ACK codebook size of the multicast service would occur.

In some embodiments of the present disclosure, when the HEI is configured to be present in group-common DCI formats for a multicast service associated with a specific G-RNTI by, for example, RRC signaling, the DAI (e.g., counter DAI) in the group-common DCI format with an enabled HEI and the DAI (e.g., counter DAI) in the group-common DCI format with a disabled HEI may be separately counted.

For example, the DAI (e.g., counter DAI) in a group-common DCI format with a CRC scrambled by the specific G-RNTI and an enabled HEI may indicate the accumulative number of transmitted group-common DCI formats with CRCs scrambled by the specific G-RNTI and HEI enabled for scheduling a multicast PDSCH, activating a multicast SPS PDSCH, releasing a multicast SPS PDSCH or indicating SCell dormancy, which requires HARQ-ACK feedback, up to the current serving cell and current PDCCH monitoring occasion. For example, the DAI (e.g., counter DAI) in a group-common DCI format with a CRC scrambled by the specific G-RNTI and a disabled HEI may indicate the accumulative number of transmitted group-common DCI formats with CRCs scrambled by the specific G-RNTI and HEI disabled for scheduling a multicast PDSCH, activating a multicast SPS PDSCH, releasing a multicast SPS PDSCH or indicating SCell dormancy, which does not require HARQ-ACK feedback, up to the current serving cell and current PDCCH monitoring occasion.

In some embodiments of the present disclosure, the total DAI, when present, in the group-common DCI format with an enabled HEI and the total DAI in the group-common DCI format with a disabled HEI may be separately counted.

Referring again to FIG. 2, assuming that multicast service #A is carried on a single carrier, DCI formats 211-214 may include a single DAI (e.g., counter DAI). In the case that DCI formats 211 and 214 indicate enabled HARQ-ACK feedback and DCI formats 212 and 213 indicate disabled HARQ-ACK feedback, the values of the DAIs in DCI formats 211 and 214 and the values of the DAIs in DCI formats 212 and 213. For example, the values of the DAIs in DCI formats 211 and 214 may be respectively set as 1 and 2, and the values of the DAIs in DCI formats 212 and 213 may be respectively set as 1 and 2.

In the case that DCI format 212 is missed, the UE can identify that DCI format 212 is missed and indicates disabled HARQ-ACK feedback based on the DAI in DCI format 213. Accordingly, no misunderstanding between the UE and the BS regarding the HARQ-ACK codebook size of the multicast service would occur.

In some embodiments of the present disclosure, when the HEI is configured to be present in a group-common DCI format for a multicast service associated with a specific G-RNTI, the definition of the DAI (e.g., counter DAI and total DAI) of a group-common DCI format may follow the legacy definition. For example, the DAI (e.g., counter DAI) may indicate the accumulative number of transmitted group-common DCI formats for the multicast service. In some embodiments, when HARQ-ACK feedback for the multicast service is to be multiplexed with HARQ-ACK feedback for a unicast service in the same PUCCH, the PUCCH resource may be determined based on a PUCCH resource indicator (PRI) in the last transmitted unicast DCI format (also referred to as "UE-specific DCI format"). To avoid any ambiguity regarding HARQ-ACK feedback for the multicast service between the BS and the UE, a medium access control (MAC) control element (CE) on the unicast PDSCH (also referred to as "UE-specific PDSCH") scheduled by the last transmitted unicast DCI format may indicate the HEIs of the group-common DCI formats with CRCs scrambled by the specific G-RNTI and HARQ-ACK feedback for the corresponding scheduled PDSCHs to be transmitted in the same slot (e.g., on the PUCCH).

The last transmitted unicast DCI format refers to a unicast DCI format last transmitted among the unicast DCI formats with HARQ-ACK feedback to be transmitted on the PUCCH. The MAC CE of the last transmitted unicast DCI format may indicate the HEIs of the group-common DCI formats scheduling PDSCHs which are transmitted before the UL slot in which the PUCCH is transmitted. For example, the last transmitted unicast DCI format may be transmitted after all group-common DCI formats with HARQ-ACK feedback to be transmitted on the PUCCH, before at least one group-common DCI format with HARQ-ACK feedback to be transmitted on the PUCCH, or before at least one group-common DCI format with disabled HARQ-ACK feedback.

In some examples, the MAC CE may indicate the HEIs of the group-common DCI formats for the multicast service in a form of a bitmap and the HEIs of the group-common DCI formats are ordered according to a predefined order (e.g., an ascending or descending order of the DAIs of the group-common DCI formats). In response to the reception of the last unicast DCI format, the UE can determine a HARQ-ACK feedback enabling/disabling preference for each group-common DCI format for the multicast service and generate a correct HARQ-ACK sub-codebook for the multicast service.

Figure 3:
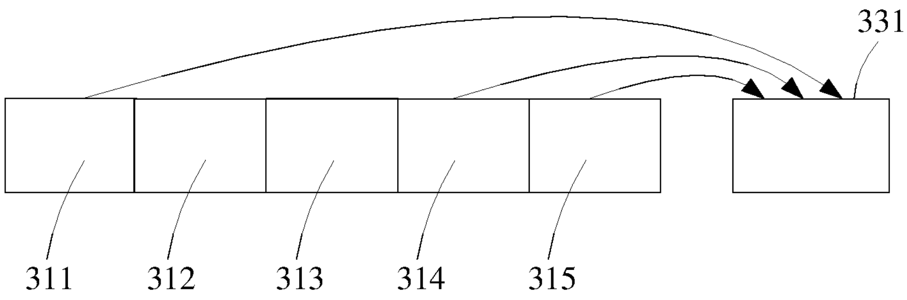
FIG. 3 illustrates a schematic diagram of HARQ-ACK codebook determination in accordance with some embodiments of the present disclosure.

For example, referring to FIG. 3, it is assumed that a UE supports multicast service #B associated with G-RNTI #B and unicast service #C. A BS may transmit, to the UE, four DCI formats 311-314 with DAIs equal to 1, 2, 3, and 4 (e.g., "00", "01", "10", and "11"), respectively, to schedule four PDSCHs (e.g., PDSCHs #1'-#4') associated with multicast service #B. The BS may transmit, to the UE, a DCI format 315 to schedule a PDSCH (e.g., PDSCHs #5') associated with unicast service #C.

The BS may enable HARQ-ACK feedback for PDSCHs #1' and #4' by enabling the HEIs in DCI formats 311 and 314 (e.g., setting the HEIs to "1") and may disable HARQ-ACK feedback for PDSCHs #2' and #3' by disabling the HEIs in DCI formats 312 and 313 (e.g., setting the HEIs to "0"). The BS may further indicate that HARQ-ACK feedback for PDSCHs #1' and #4' and HARQ-ACK feedback for PDSCH #5' are to be transmitted in the same slot (e.g., on PUCCH 331). The MAC CE of PDSCH #5' may indicate HEIs of DCI formats 311-314. For example, the MAC CE may indicate a bitmap of "1001."

In some example, the BS may further transmit, to the UE, another DCI format (e.g., DCI format #6') after DCI format 315 to schedule a PDSCH (e.g., PDSCH #6') associated with multicast service #B. The BS may indicate that HARQ-ACK feedback for PDSCH #6' is to be multiplexed on PUCCH 331. The MAC CE of PDSCH #5' may indicate HEIs of DCI formats 311-314 and DCI format #6'.

In some embodiments of the present disclosure, when the HEI is configured to be present in a group-common DCI format for a multicast service associated with a specific G-RNTI, the definition of the DAI (e.g., counter DAI and total DAI) of a group-common DCI format may follow the legacy definition. In some embodiments, when HARQ-ACK feedback for the multicast service is to be multiplexed on a PUSCH scheduled by a unicast DCI format, the unicast DCI format may include at least one UL DAI, which may be associated with the number of group-common DCI formats with an enabled HEI to be multiplexed on the scheduled PUSCH. By employing such UL DAI, the UE can generate a correct HARQ-ACK sub-codebook for the multicast service.

In some examples, the unicast DCI format may include at least two UL DAI fields (e.g., UL DAI #1A and UL DAI #2A). UL DAI #1A may indicate the number of the unicast DCI formats with HARQ-ACK feedback to be multiplexed on the scheduled PUSCH. UL DAI #2A may indicate the number of the group-common DCI formats with enabled HARQ-ACK feedback to be multiplexed on the scheduled PUSCH. That is, the value of UL DAI #2A does not take the number of the group-common DCI formats with disabled HARQ-ACK feedback into account.

In some examples, the unicast DCI format may include a single UL DAI field (e.g., UL DAI #B). UL DAI #B may indicate the total number of unicast DCI formats with HARQ-ACK feedback to be multiplexed on the scheduled PUSCH and group-common DCI formats with enabled HARQ-ACK feedback to be multiplexed on the same PUSCH.

Figure 4:
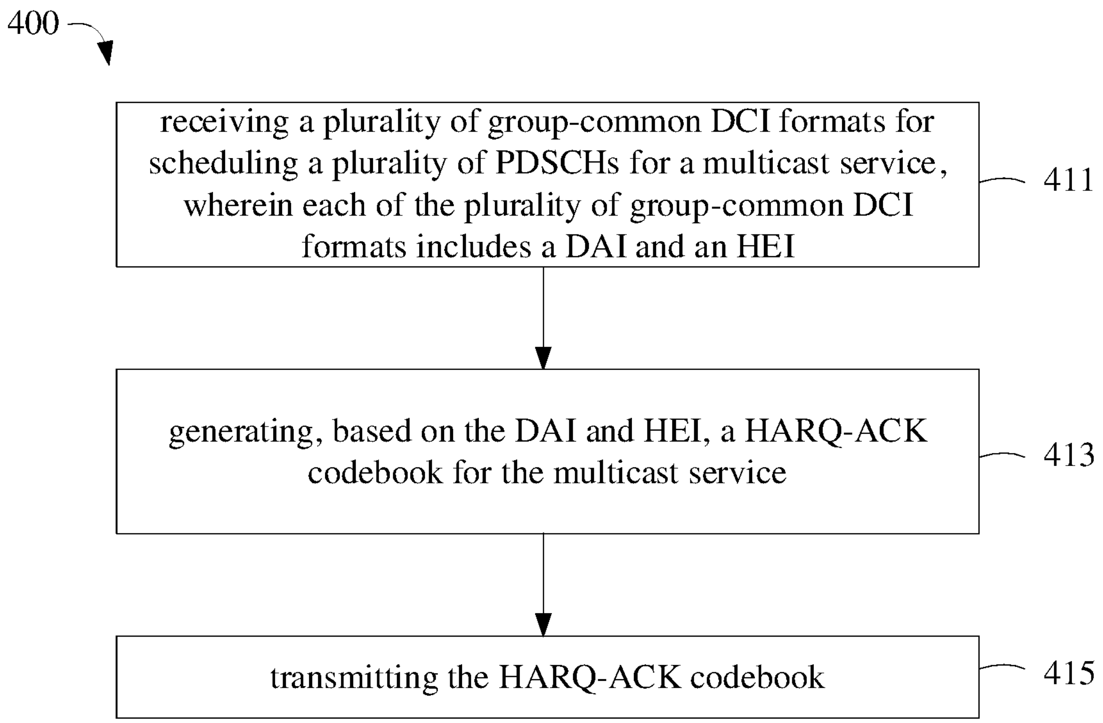
FIG. 4 illustrates a flow chart of an exemplary procedure of wireless communications in accordance with some embodiments of the present disclosure.

FIG. 4 illustrates a flow chart of an exemplary procedure 400 for wireless communications in accordance with some embodiments of the present disclosure. Details described in all of the foregoing embodiments of the present disclosure are applicable for the embodiments shown in FIG. 4. In some examples, the procedure may be performed by a UE, for example, UE 101 in FIG. 1.

Referring to FIG. 4, in operation 411, a UE may receive a plurality of group-common DCI formats for scheduling a plurality of PDSCHs for a multicast service. Each of the plurality of group-common DCI formats may include a DAI and an HEI.

In some embodiments of the present disclosure, the DAI may indicate an accumulative number of transmitted group-common DCI formats with an enabled HEI among the plurality of group-common DCI formats. In some examples, in response to a plurality of carriers for the multicast service, each of the plurality of group-common DCI formats may further include another DAI (e.g., total DAI) indicating a total number of group-common DCI formats on the plurality of carriers with an enabled HEI among the plurality of group-common DCI formats.

In some examples, in response to a first DCI format with a disabled HEI of the plurality of group-common DCI formats being transmitted earlier than any other DCI formats of the plurality of group-common DCI formats, the DAI of the first DCI format may be set to a predefined value. In some examples, in response to a second DCI format with an enabled HEI of the plurality of group-common DCI formats being transmitted earlier than a third DCI format with a disabled HEI of the plurality of group-common DCI formats, the DAI of the third DCI format may be the same as that of the second DCI format. In some examples, in response to a fourth DCI format with a disabled HEI of the plurality of group-common DCI formats being transmitted earlier than a fifth DCI format with a disabled HEI of the plurality of group-common DCI formats, the DAI of the fifth DCI format may be the same as that of the fourth DCI format.

In some embodiments of the present disclosure, each DCI format with a disabled HEI of the plurality of group-common DCI formats may further include an indicator (e.g., the association indicator). The indicator may be an HTI, a PRI, or any combination thereof.

In some examples, in response to a second DCI format with an enabled HEI of the plurality of group-common DCI formats being transmitted earlier than a first DCI format with a disabled HEI of the plurality of group-common DCI formats, the indicator of the first DCI format may indicate a position of the second DCI format, or a DAI of the second DCI format. In some examples, in response to the first transmitted DCI format among the plurality of group-common DCI formats with a disabled HEI, the indicator of the first transmitted DCI format may be set to a predefined value. The position of the second DCI format may include a slot offset between a slot where the first DCI format is transmitted and a slot where the second DCI format is transmitted.

In some examples, in response to a first DCI format with a disabled HEI of the plurality of group-common DCI formats being transmitted earlier than a second DCI format with an enabled HEI of the plurality of group-common DCI formats, the indicator of the first DCI format may indicate a position of the second DCI format, or a DAI of the second DCI format. In some examples, in response to the last transmitted DCI format among the plurality of group-common DCI formats with a disabled HEI, the indicator of the last transmitted DCI format may be set to a predefined value. The position of the second DCI format may include a slot offset between a slot where the first DCI format is transmitted and a slot where the second DCI format is transmitted.

In some embodiments of the present disclosure, the DAIs may be counted separately among group-common DCI formats with each having an enabled HEI and group-common DCI formats with each having a disabled HEI of the plurality of group-common DCI formats.

In some embodiments of the present disclosure, the HARQ-ACK codebook is to be multiplexed with HARQ-ACK feedback for at least one UE-specific PDSCH in the same PUCCH. A MAC CE of the last transmitted UE-specific PDSCH of the at least one UE-specific PDSCH may indicate the HEIs of the plurality of group-common DCI formats. The HEIs of the plurality of group-common DCI formats indicated in the MAC CE may be ordered according to the DAIs of the plurality of group-common DCI formats.

In some embodiments of the present disclosure, the HARQ-ACK codebook is to be multiplexed on a PUSCH scheduled by a UE-specific DCI format. The UE-specific DCI format includes a UL DAI. In some examples, the UL DAI may indicate the number of group-common DCI formats with an enabled HEI to be multiplexed on the scheduled PUSCH. In some examples, the UL DAI may indicate the total number of UE-specific DCI formats with HARQ-ACK feedback to be multiplexed on the scheduled PUSCH and group-common DCI formats with an enabled HEI to be multiplexed on the scheduled PUSCH.

In operation 413, the UE may generate, based on the DAI and HEI, a HARQ-ACK codebook for the multicast service. In operation 415, the UE may transmit the HARQ-ACK codebook.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
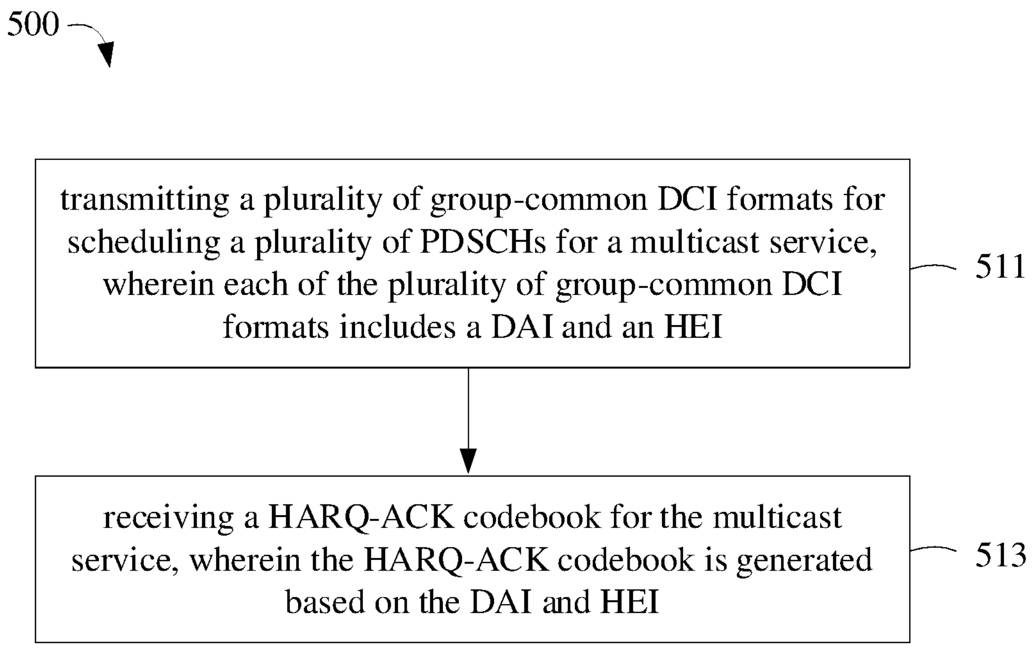
FIG. 5 illustrates a flow chart of an exemplary procedure of wireless communications in accordance with some embodiments of the present disclosure.

FIG. 5 illustrates a flow chart of an exemplary procedure 500 for wireless communications in accordance with some embodiments of the present disclosure. Details described in all of the foregoing embodiments of the present disclosure are applicable for the embodiments shown in FIG. 5. In some examples, the procedure may be performed by a BS, for example, BS 102 in FIG. 1.

Referring to FIG. 5, in operation 511, a BS may transmit a plurality of DCI formats for scheduling a plurality of PDSCHs for a multicast service. Each of the plurality of group-common DCI formats may include a DAI and an HEI.

In some embodiments of the present disclosure, the DAI may indicate an accumulative number of transmitted group-common DCI formats with an enabled HEI among the plurality of group-common DCI formats. In some examples, in response to a plurality of carriers for the multicast service, each of the plurality of group-common DCI formats may further include another DAI (e.g., total DAI) indicating a total number of group-common DCI formats on the plurality of carriers with an enabled HEI among the plurality of group-common DCI formats.

In some examples, in response to a first DCI format with a disabled HEI among the plurality of group-common DCI formats being transmitted earlier than any other DCI formats of the plurality of group-common DCI formats, the DAI of the first DCI format may be set to a predefined value. In some examples, in response to a second DCI format with an enabled HEI of the plurality of group-common DCI formats being transmitted earlier than a third DCI format with a disabled HEI of the plurality of group-common DCI formats, the DAI of the third DCI format may be the same as that of the second DCI format. In some examples, in response to a fourth DCI format with a disabled HEI of the plurality of group-common DCI formats being transmitted earlier than a fifth DCI format with a disabled HEI of the plurality of group-common DCI formats, the DAI of the fifth DCI format may be the same as that of the fourth DCI format.

In some embodiments of the present disclosure, each DCI format with a disabled HEI of the plurality of group-common DCI formats may further include an indicator (e.g., the association indicator). The indicator may be an HTI, a PRI, or any combination thereof.

In some examples, in response to a second DCI format with an enabled HEI of the plurality of group-common DCI formats being transmitted earlier than a first DCI format with a disabled HEI of the plurality of group-common DCI formats, the indicator of the first DCI format may indicate a position of the second DCI format, or a DAI of the second DCI format. In some examples, in response to the first transmitted DCI format among the plurality of group-common DCI formats with a disabled HEI, the indicator of the first transmitted DCI format may be set to a predefined value. The position of the second DCI format may include a slot offset between a slot where the first DCI format is transmitted and a slot where the second DCI format is transmitted.

In some examples, in response to a first DCI format with a disabled HEI of the plurality of group-common DCI formats being transmitted earlier than a second DCI format with an enabled HEI of the plurality of group-common DCI formats, the indicator of the first DCI format may indicate a position of the second DCI format, or a DAI of the second DCI format. In some examples, in response to the last transmitted DCI format among the plurality of group-common DCI formats with a disabled HEI, the indicator of the last transmitted DCI format may be set to a predefined value. The position of the second DCI format may include a slot offset between a slot where the first DCI format is transmitted and a slot where the second DCI format is transmitted.

In some embodiments of the present disclosure, the DAIs may be counted separately among group-common DCI formats with each having an enabled HEI and group-common DCI formats with each having a disabled HEI of the plurality of group-common DCI formats.

In some embodiments of the present disclosure, the HARQ-ACK codebook is to be multiplexed with HARQ-ACK feedback for at least one UE-specific PDSCH in the same PUCCH. A MAC CE of the last transmitted UE-specific PDSCH of the at least one UE-specific PDSCH may indicate the HEIs of the plurality of group-common DCI formats. The HEIs of the plurality of group-common DCI formats indicated in the MAC CE may be ordered according to the DAIs of the plurality of group-common DCI formats.

In some embodiments of the present disclosure, the HARQ-ACK codebook is to be multiplexed on a PUSCH scheduled by a UE-specific DCI format. The UE-specific DCI format includes a UL DAI. In some examples, the UL DAI may indicate the number of group-common DCI formats with an enabled HEI to be multiplexed on the scheduled PUSCH. In some examples, the UL DAI may indicate the total number of UE-specific DCI formats with HARQ-ACK feedback to be multiplexed on the scheduled PUSCH and group-common DCI formats with an enabled HEI to be multiplexed on the scheduled PUSCH.

In operation 513, the BS may receive a HARQ-ACK codebook for the multicast service. The HARQ-ACK codebook may be generated based on the DAI and HEI.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
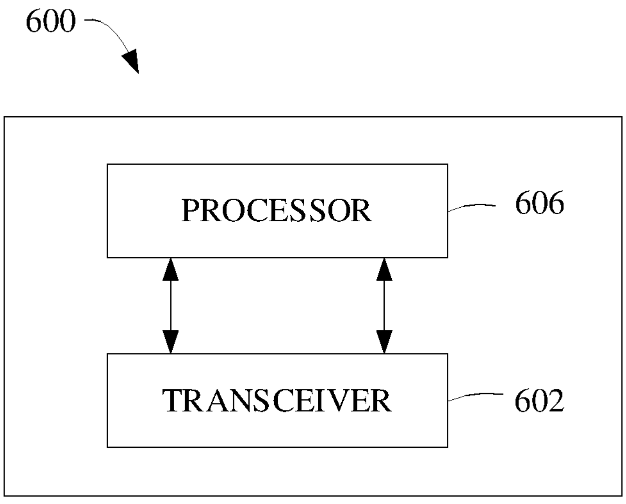
FIG. 6 illustrates a block diagram of an exemplary apparatus in accordance with some embodiments of the present disclosure.

FIG. 6 illustrates a block diagram of an exemplary apparatus 600 according to some embodiments of the present disclosure. As shown in FIG. 6, the apparatus 600 may include at least one processor 606 and at least one transceiver 602 coupled to the processor 606. The apparatus 600 may be a UE or a BS.

Although in this figure, elements such as the at least one transceiver 602 and processor 606 are described in the singular, the plural is contemplated unless a limitation to the singular is explicitly stated. In some embodiments of the present application, the transceiver 602 may be divided into two devices, such as a receiving circuitry and a transmitting circuitry. In some embodiments of the present application, the apparatus 600 may further include an input device, a memory, and/or other components.

In some embodiments of the present application, the apparatus 600 may be a UE. The transceiver 602 and the processor 606 may interact with each other so as to perform the operations with respect to the UE described in FIGS. 1-5. In some embodiments of the present application, the apparatus 600 may be a BS. The transceiver 602 and the processor 606 may interact with each other so as to perform the operations with respect to the BS described in FIGS. 1-5.

In some embodiments of the present application, the apparatus 600 may further include at least one non-transitory computer-readable medium.

For example, in some embodiments of the present disclosure, the non-transitory computer-readable medium may have stored thereon computer-executable instructions to cause the processor 606 to implement the method with respect to the UE as described above. For example, the computer-executable instructions, when executed, cause the processor 606 interacting with transceiver 602 to perform the operations with respect to the UE described in FIGS. 1-5.

In some embodiments of the present disclosure, the non-transitory computer-readable medium may have stored thereon computer-executable instructions to cause the processor 606 to implement the method with respect to the BS as described above. For example, the computer-executable instructions, when executed, cause the processor 606 interacting with transceiver 602 to perform the operations with respect to the BS described in FIGS. 1-5.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A user equipment (UE), comprising:
at least one memory; and
at least one processor coupled with the at least one memory and configured to cause the UE to:
receive a plurality of group-common downlink control information (DCI) formats for scheduling a plurality of physical downlink shared channels (PDSCHs) for a multicast service, wherein each of the plurality of group-common DCI formats includes a downlink assignment index (DAI) and a hybrid automatic repeat request acknowledgement (HARQ-ACK) feedback enabling/disabling indicator (HEI);
receive a UE-specific DCI format scheduling a physical uplink shared channel (PUSCH), the UE-specific DCI format including an uplink (UL) DAI that indicates a number of group-common DCI formats, of the plurality, that have an enabled HEI and for which corresponding HARQ-ACK information is to be multiplexed on the scheduled PUSCH;
generate, based on the DAI and the HEI of each of the plurality of group-common DCI formats, as well as the UL DAI, a HARQ-ACK codebook for the multicast service; and
transmit the HARQ-ACK codebook by multiplexing the HARQ-ACK codebook on the scheduled PUSCH.

2. The UE of claim 1, wherein the DAI indicates an accumulative number of received group-common DCI formats with an enabled HEI among the plurality of group-common DCI formats.

3. The UE of claim 2, wherein:
in response to a first DCI format with a disabled HEI of the plurality of group-common DCI formats being received earlier than any other DCI formats of the plurality of group-common DCI formats, the DAI of the first DCI format is set to a predefined value;
in response to a second DCI format with an enabled HEI of the plurality of group-common DCI formats being received earlier than a third DCI format with a disabled HEI of the plurality of group-common DCI formats, the DAI of the third DCI format is the same as that of the second DCI format; or
in response to a fourth DCI format with a disabled HEI of the plurality of group-common DCI formats being received earlier than a fifth DCI format with a disabled HEI of the plurality of group-common DCI formats, the DAI of the fifth DCI format is the same as that of the fourth DCI format.

4. The UE of claim 1, wherein each DCI format with disabled HEI of the plurality of group-common DCI formats further includes an indicator, and wherein in response to a second DCI format with an enabled HEI of the plurality of group-common DCI formats being received earlier than a first DCI format with a disabled HEI of the plurality of group-common DCI formats, the indicator of the first DCI format indicates a position of the second DCI format, or a DAI of the second DCI format.

5. The UE of claim 4, wherein in response to the first received DCI format among the plurality of group-common DCI formats with a disabled HEI, the indicator of the first received DCI format is set to a predefined value.

6. The UE of claim 1, wherein each DCI format with disabled HEI of the plurality of group-common DCI formats further includes an indicator, and wherein in response to a first DCI format with a disabled HEI of the plurality of group-common DCI formats being received earlier than a second DCI format with an enabled HEI of the plurality of group-common DCI formats, the indicator of the first DCI format indicates a position of the second DCI format, or a DAI of the second DCI format.

7. The UE of claim 6, wherein in response to the last received DCI format among the plurality of group-common DCI formats with a disabled HEI, the indicator of the last received DCI format is set to a predefined value.

8. The UE of claim 4, wherein the position of the second DCI format comprises a slot offset between a slot in which the first DCI format is received and a slot in which the second DCI format is received.

9. The UE of claim 4, wherein the indicator is a HARQ timing indicator (HTI), a physical uplink control channel (PUCCH) resource indicator (PRI), or any combination thereof.

10. The UE of claim 1, wherein the DAIs are counted separately among group-common DCI formats with each having an enabled HEI and group-common DCI formats with each having a disabled HEI of the plurality of group-common DCI formats.

11. The UE of claim 1, wherein the at least one processor is configured to cause the UE to receive at least one UE-specific PDSCH, and wherein a medium access control (MAC) control element (CE) of the last received UE-specific PDSCH of the at least one UE-specific PDSCH indicates the HEIs of the plurality of group-common DCI formats.

12. The UE of claim 11, wherein the HEIs of the plurality of group-common DCI formats indicated in the MAC CE are ordered according to the DAIs of the plurality of group-common DCI formats.

13. A base station (BS), comprising:
- at least one memory; and
- at least one processor coupled with the at least one memory and configured to cause the base station to:
  - transmit a plurality of group-common downlink control information (DCI) formats for scheduling a plurality of physical downlink shared channels (PDSCHs) for a multicast service, wherein each of the plurality of group-common DCI formats includes a downlink assignment index (DAI) and a hybrid automatic repeat request acknowledgement (HARQ-ACK) feedback enabling/disabling indicator (HEI);
  - transmit a UE-specific DCI format scheduling a physical uplink shared channel (PUSCH), the UE-specific DCI format including an uplink (UL) DAI that indicates a number of group-common DCI formats, of the plurality, that have an enabled HEI and for which corresponding HARQ-ACK information is to be multiplexed on the PUSCH; and
  - receive a HARQ-ACK codebook for the multicast service multiplexed on the PUSCH, wherein the HARQ-ACK codebook is generated based on the DAI and the HEI of each of the plurality of group-common DCI formats, as well as the UL DAI.

14. A method performed by a user equipment (UE), the method comprising:
- receiving a plurality of group-common downlink control information (DCI) formats for scheduling a plurality of physical downlink shared channels (PDSCHs) for a multicast service, wherein each of the plurality of group-common DCI formats includes a downlink assignment index (DAI) and a hybrid automatic repeat request acknowledgement (HARQ-ACK) feedback enabling/disabling indicator (HEI);
- receiving a UE-specific DCI format scheduling a physical uplink shared channel (PUSCH), the UE-specific DCI format including an uplink (UL) DAI that indicates a number of group-common DCI formats, of the plurality, that have an enabled HEI and for which corresponding HARQ-ACK information is to be multiplexed on the scheduled PUSCH;
- generating, based on the DAI and the HEI of each of the plurality of group-common DCI formats, as well as the UL DAI, a HARQ-ACK codebook for the multicast service; and
- transmitting the HARQ-ACK codebook by multiplexing the HARQ-ACK codebook on the scheduled PUSCH.

15. The method of claim 14, wherein the DAI indicates an accumulative number of received group-common DCI formats with an enabled HEI among the plurality of group-common DCI formats.

16. The method of claim 15, wherein:
- in response to a first DCI format with a disabled HEI of the plurality of group-common DCI formats being received earlier than any other DCI formats of the plurality of group-common DCI formats, the DAI of the first DCI format is set to a predefined value;
- in response to a second DCI format with an enabled HEI of the plurality of group-common DCI formats being received earlier than a third DCI format with a disabled HEI of the plurality of group-common DCI formats, the DAI of the third DCI format is the same as that of the second DCI format; or
- in response to a fourth DCI format with a disabled HEI of the plurality of group-common DCI formats being received earlier than a fifth DCI format with a disabled HEI of the plurality of group-common DCI formats, the DAI of the fifth DCI format is the same as that of the fourth DCI format.

17. The method of claim 14, wherein each DCI format with disabled HEI of the plurality of group-common DCI formats further includes an indicator, and wherein in response to a second DCI format with an enabled HEI of the plurality of group-common DCI formats being received earlier than a first DCI format with a disabled HEI of the plurality of group-common DCI formats, the indicator of the first DCI format indicates a position of the second DCI format, or a DAI of the second DCI format.

18. The method of claim 17, wherein in response to the first received DCI format among the plurality of group-common DCI formats with a disabled HEI, the indicator of the first received DCI format is set to a predefined value.

19. The method of claim 14, wherein each DCI format with disabled HEI of the plurality of group-common DCI formats further includes an indicator, and wherein in response to a first DCI format with a disabled HEI of the plurality of group-common DCI formats being received earlier than a second DCI format with an enabled HEI of the plurality of group-common DCI formats, the indicator of the first DCI format indicates a position of the second DCI format, or a DAI of the second DCI format.

20. A method performed by a base station (BS), comprising:
- transmitting a plurality of group-common downlink control information (DCI) formats for scheduling a plurality of physical downlink shared channels (PDSCHs) for a multicast service, wherein each of the plurality of group-common DCI formats includes a downlink assignment index (DAI) and a hybrid automatic repeat request acknowledgement (HARQ-ACK) feedback enabling/disabling indicator (HEI);
- transmitting a UE-specific DCI format scheduling a physical uplink shared channel (PUSCH), the UE-specific DCI format including an uplink (UL) DAI that indicates a number of group-common DCI formats, of the plurality, that have an enabled HEI and for which corresponding HARQ-ACK information is to be multiplexed on the PUSCH; and receiving a HARQ-ACK codebook for the multicast service multiplexed on the PUSCH, wherein the HARQ-ACK codebook is generated based on the DAI and the HEI of each of the plurality of group-common DCI formats, as well as the UL DAI.

* * * * *